US010050670B1

(12) United States Patent
Hill et al.

(10) Patent No.: US 10,050,670 B1
(45) Date of Patent: *Aug. 14, 2018

(54) POWER DISTRIBUTION SYSTEM DISCOVERY

(71) Applicant: Amazon Technologies, Inc., Seattle, WA (US)

(72) Inventors: Peter J. Hill, Seattle, WA (US); Matthew D. Rehder, Seattle, WA (US); Joseph J. Lindsay, Seattle, WA (US); John William Eichelberg, Spokane, WA (US); Daniel J. Rohrabaugh, Seattle, WA (US); Andrew Bruce Dickinson, Seattle, WA (US); Thomas Bradley Scholl, Seattle, WA (US); Travis S. Pepper, Seattle, WA (US); Michael Phillip Czamara, Seattle, WA (US); Richard M. Lotz, Seattle, WA (US); Paul A. Stancik, Seattle, WA (US); Eduardo M. Parra, Redmond, WA (US); Samuel Joseph Mortimer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/936,618

(22) Filed: Nov. 9, 2015

Related U.S. Application Data (63) Continuation of application No. 13/425,285, filed on Mar. 20, 2012, now Pat. No. 9,182,795.

(51) Int. Cl.
*G06F 1/26* (2006.01)
*H04B 3/54* (2006.01)

(52) U.S. Cl.
CPC .................................. *H04B 3/54* (2013.01)

(58) Field of Classification Search
CPC .. H04B 3/54; H04B 3/542; G06F 1/26; G06F 1/263; G06F 1/266; G06F 1/28; G06F 1/30
See application file for complete search history.

(56) References Cited

U.S. PATENT DOCUMENTS

| 6,714,977 | B1 | 3/2004 | Fowler et al. |
|---|---|---|---|
| 6,782,833 | B2 | 8/2004 | Nightall |
| 7,269,753 | B2 | 9/2007 | Farkas et al. |
| 7,917,792 | B2 | 3/2011 | Brech et al. |
| 8,321,163 | B2 | 11/2012 | Ewing et al. |
| 8,639,459 | B1 | 1/2014 | Morales et al. |
| 8,674,823 | B1 | 3/2014 | Contario et al. |
| 8,726,045 | B2 | 5/2014 | Goodrum et al. |

(Continued)

OTHER PUBLICATIONS

"Two-Channel Intercom Power Supply PS-232" Clear-Com Intercom Systems 2002, pp. 1-2.

(Continued)

*Primary Examiner* — An Luu
(74) *Attorney, Agent, or Firm* — Robert C. Kowert; Meyertons, Hood, Kivlin, Kowert & Goetzel, P.C.

(57) ABSTRACT

A power distribution system includes two or more power components that distribute power to one or more electrical components. At least some of the power components send and receive signals over power transmission lines to upstream or downstream power components in the power distribution system. The signals include information about power components in the power distribution system.

20 Claims, 6 Drawing Sheets

(56) References Cited

U.S. PATENT DOCUMENTS

| | | |
|---|---|---|
| 8,996,323 B1 | 3/2015 | Morales et al. |
| 2008/0093927 A1 | 4/2008 | Ewing et al. |
| 2009/0189774 A1 | 7/2009 | Brundridge et al. |

OTHER PUBLICATIONS

Keith Brandt "When Bad Harmonics Happen to Good People" Downloaded May 13, 2011 from news.ospmag.com OSP Magazine published Nov. 2007 pp. 1-3.

POWER DISTRIBUTION SYSTEM DISCOVERY

This application is a continuation of U.S. patent application Ser. No. 13/425,285, filed Mar. 20, 2012, now U.S. Pat. No. 9,182,795, which is hereby incorporated herein by reference in its entirety.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

A common challenge in data centers is knowing whether or not equipment has been connected correctly to various power sources. In many cases, documentation is kept by service personnel showing the configuration of a power distribution system and its components. Ideally, the documentation precisely reflects all of the components that are in the system and how the components are connected. In practice, however, such documentation may be incomplete, inaccurate, or out-of-date due to oversights or errors by the personnel responsible for the documentation.

From time to time, elements in the power chain providing power to electrical systems fail or shut down. For example, if a power distribution unit that provides power to electrical systems is overloaded, an overload protection device in the power distribution unit (for example, a fuse or breaker) may trip, shutting down all of the electrical systems that are receiving power through that line of the power distribution unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for acquiring and using information about an electrical power distribution system are disclosed. According to one embodiment, a power distribution system includes two or more power components that distribute power to one or more electrical components. Power transmission lines transmit power from the power components to other power components. At least some of the power components send and receive signals over the power transmission lines to upstream or downstream power components in the power distribution system. The signals may include information about power components in the power distribution system.

According to one embodiment, a power distribution system includes one or more signal-transmitting power components and one or more signal-receiving power components upstream or downstream in the power distribution system from the signal-transmitting power components. The signal-transmitting power components send signals over power transmission lines. The signal-receiving components receive signals from the signal-transmitting power components over the power transmission lines. The signals include information about power components in the power distribution system.

According to one embodiment, a power component includes one or more power devices that can transmit power to components or receive power from components over power transmission lines. The power component includes a signal-transmitting device that can send a signal over at least one of the one or more power transmission lines. The signal includes information about power components in a power distribution system.

According to one embodiment, a power distribution system includes two or more power components configured to distribute power to one or more electrical components over power transmission lines. At least some of the power components can send and receive signals to upstream or downstream power components in the power distribution system.

The signals include information about the configuration, characteristics, or condition of power components in the power distribution system.

According to one embodiment, a method of assessing power component configuration or conditions in a power distribution system includes receiving, by a power component in power distribution system, over one or more power transmission lines, one or more signals from one or more upstream or downstream power components. A configuration or conditions of power components in the power distribution system may be assessed based on the information received by the power component.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein, "neighbors", in the context of power components in a power distribution system, refers to power components that are electrically near or next to one another. For example, a power supply unit for a server neighbors a rack PDU from which it receives power. As another example, an uninterruptible power supply neighbors a floor power distribution unit that the uninterruptible power supply provides power to. As still another example, two power supply units coupled to the same power distribution unit may neighbor one another. In certain embodiments, intervening power components separate neighbors in a system (for example, a rack power distribution unit located between a floor PDU and a server power supply unit). In some embodiments, neighbors are coupled directly by way of one or more conductors between them, such as cables. As used herein, a "direct neighbors" means power components that are separated only by conductors, without any intervening power components.

As used herein, a "power component", in the context of a power distribution system, means a component, device, or system that supplies power to one or more other components, devices, systems, or loads in a system. Examples of power components in a power distribution system include a power supply unit, a power supply module, a rack PDU, a floor PDU, a UPS, a power bus, a backfeed apparatus, a distribution panel, a generator, or a transformer.

As used herein, "power transmission line" a line that transmits power from one component to another component. Examples of power transmission lines include conductors that carry power from a UPS to a floor PDU, conductors that carry power from a floor PDU to a rack PDU, and conductors that carry power from a rack PDU to a server power supply unit. Power transmission lines may have any form, such as a cable, bus bar, or other conductive member or device.

As used herein, "signal" includes any signal, message, pulse, wave, or combination thereof, that can provide information from one element to another element. A signal may serve to indicate, identify, inform, direct, instruct, command, or warn. A signal may be a discrete set of information (for example, a sequence of characters in a message), continuous (such as a wave), periodic, or a combination thereof. In some cases, a signal is a message having a predetermined format or arrangement, such as a sequence of characters (for example, a message representing the string PWRID0002436). In some embodiments, a signal includes an identifying address of the device sending the signal. In some embodiments, a signal includes information about characteristics or conditions of a component, device, or system.

As used herein, one component in a power distribution system is "upstream" from another component in the power distribution system if the one component supplies power to the other component or is at a higher level in the power distribution system than the other component. For example, a UPS may be upstream from a floor PDU, or a rack PDU may be upstream from a power supply unit for a server.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, and isolation.

As used herein, "floor power distribution unit" refers to a power distribution unit that can distribute electrical power to various components in a computer room. In certain embodiments, a floor power distribution unit includes a transformer. In one embodiment, a floor power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, a "cable" includes any cable, conduit, or line that carries one or more conductors and that is flexible over at least a portion of its length. A cable may include a connector portion, such as a plug, at one or more of its ends.

As used herein, "computer room" means a room of a building in which computer systems, such as rack-mounted servers, are operated.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "co-location" includes a facility in which computing systems for one or more customers are located in which networking, operation, and/or maintenance of the computing systems is at least partially outside the customer's control. A co-location facility for multiple customers may be controlled by a co-location operator. In some embodiments, a co-location operator provides facilities, networking services, and maintenance services for co-location customers.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, a "module" is a component or a combination of components physically coupled to one another. A module may include functional elements and systems, such as computer systems, circuit boards, racks, blowers, ducts, and power distribution units, as well as structural elements, such a base, frame, housing, or container.

As used herein, a "rack" means a rack, container, frame, or other element or combination of elements that can contain or physically support one or more computing devices.

As used herein, "reserve power" means power that can be supplied to an electrical load upon the failure of, or as a substitute for, primary power to the load.

In various embodiments, a power distribution system has at least one power component that can send a signal to an upstream/downstream power component over power transmission lines and at least one upstream/downstream component that can receive the signal. The signals may include information about power components in the power distribution system. For example, the signals may include identifying information for one or more power components, characteristics of power being supplied by the power components, or conditions in the power distribution system. In some embodiments, a power distribution system includes power components that can send and receive signals to upstream and downstream power components in the system over power transmission lines.

Figure 1:
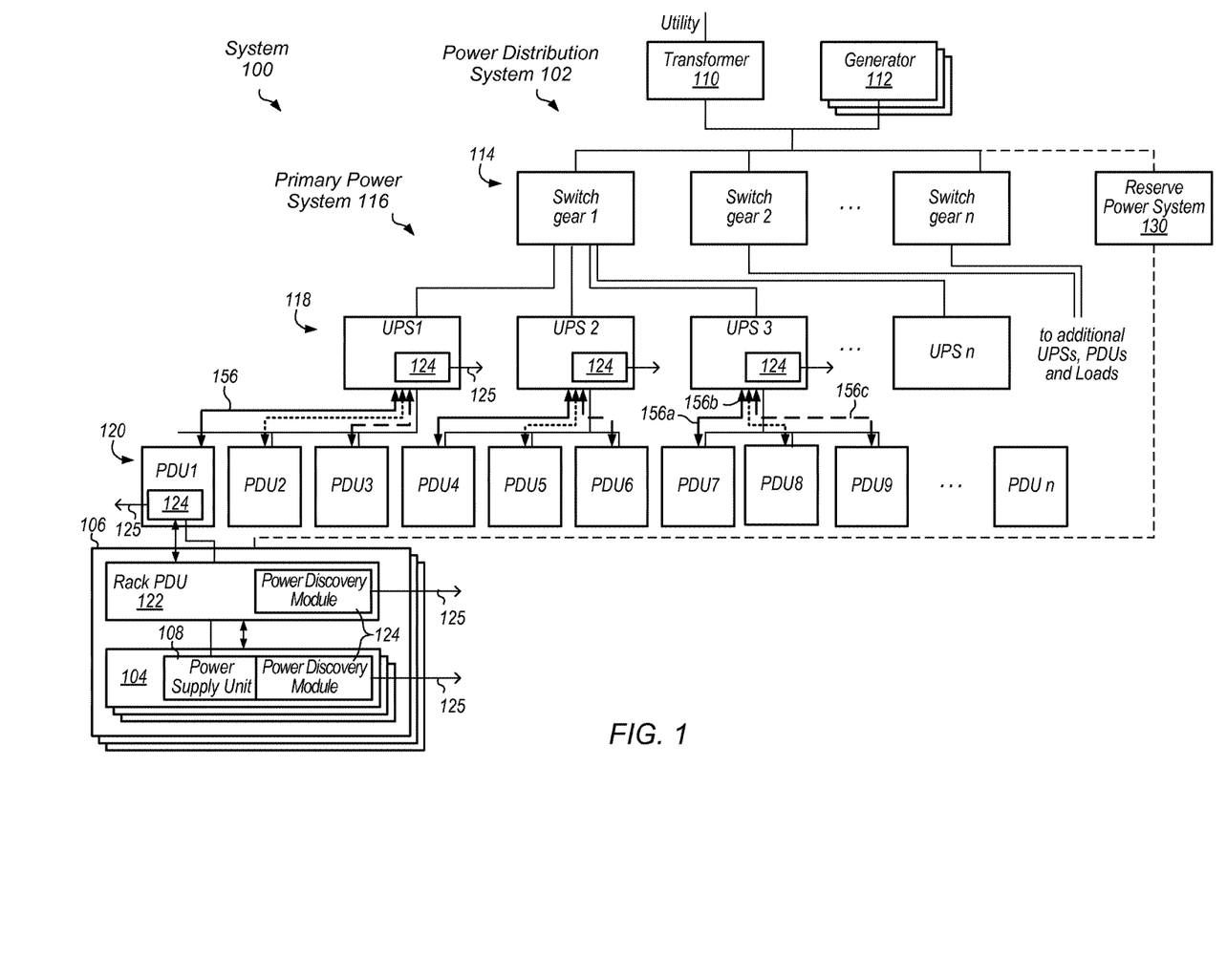
FIG. 1 is a block diagram illustrating one embodiment of a power distribution system with discovery among power components in the system.

FIG. 1 is a block diagram illustrating one embodiment of a power distribution system with information exchange and discovery among power components in the power distribution system. System 100 includes power distribution system 102 and electrical systems 104. In one embodiment, system 100 is a data center. Electrical systems 104 may include, for example, computing devices, rack-mounted servers, network control devices, power supply units, air moving devices, and mass storage devices. Electrical systems 104 may be supported in racks 106. Electrical systems 104 may perform various functions in a data center, such as data storage or network services. In one embodiment, electrical systems 104 are servers in a server room of a data center.

Each of electrical systems 104 includes power supply unit 108. Power supply unit 108 may supply power to various electrical components, such as integrated circuits, central processing units, solid state memory, and hard disk drives in electrical systems 104.

Power distribution system 102 includes transformer 110, generators 112, switchgear apparatus 114, and primary power systems 116. Each of primary power systems 116 includes UPS 118 and one or more power distribution units ("PDUs") 120.

Electrical systems 104 in racks 106 may each receive power from one of primary power systems 116. In one embodiment, each of primary power systems 116 corresponds to, and provides power to, the servers in one room in a data center. In one embodiment, each of primary power systems 116 corresponds to, and provides power to, one rack system in a data center. In FIG. 1, for the sake of clarity, electrical systems 104 are shown coupled to only one of PDUs 120. Electrical systems may, however, be coupled to any or all of PDUs 120 in a data center.

Power distribution units 120 may be floor power distribution units. In some embodiments, power distribution unit 120 includes a transformer that transforms the voltage from switchgear apparatus 114. Each of racks 106 may include one or more rack power distribution units 122. The rack power distribution units 122 may distribute power to power supply units 108 in computer systems 104.

Various ones of power components in the power distribution chain, including UPSs 118, PDUs 120, rack PDUs 122, and power supply units 108, include power system discovery modules 124. Each of power system discovery modules 124 may send and receive signals to power system discovery modules 124 in other power components in system 100. Signals between power system discovery modules 124 may be sent over power transmission lines 126 between the power components.

In some embodiments, power components in a power distribution system exchange signals based on a protocol for exchanging, reporting, and using signals among power components. The protocol may define signal formats, message formats, rules, and procedures. In some embodiments, a system includes a protocol for acquiring connectivity information among power components in the power distribution system. Each power component that sends or receives messages identifying information may send identity and system location messages in a prescribed format.

In some embodiments, messaging formats, rules, synchronization, or other aspects of signals between power components are implemented in accordance with, or based on, a standard protocol, such as link layer discovery protocol (LLDP) or industry standard discovery protocol (ISDP).

In some embodiments, power components send and receive signals over one or more power transmission lines while power is being transmitted over the power transmission line. In one embodiment, signals between power components are transmitted over alternating current (AC) power supplied by a power distribution system. In certain embodiments, signals are transmitted over direct current (DC) power supplied by a power distribution system.

In some embodiments, power components in a power distribution system are each assigned one or more identifiers. Each identifier may serve as an address for the power component or a constituent element of the power component. The identifier may be stored in a memory on the power component. The address may be used to map power components in the power distribution system. An identifier for power component may have any suitable format. In some embodiments, a separate identifier may be assigned for the power component itself and for additional elements, inputs, or outputs within the power component. For example, a separate identifier may be established for each power output receptacle of a power distribution unit.

Power system discovery modules 124 may send and receive messages 125 to external systems over a network connection. Messages sent to power system discovery modules 124 over a network may include instructions to the power system discovery module 124 on what signals are to be transmitted to upstream or downstream components by the power system discovery module 124. Messages sent to external systems over a network may include information acquired from signals received by the power system discovery module 124, such as what UPS the power component is receiving power from, or what phase of power the power component is receiving. In certain embodiments, information from signal exchanges between power components is used in conjunction with information acquired from branch circuit monitoring.

In some embodiments, signals exchanged among power components are used to monitor and assess characteristics of a power distribution system. Characteristics of the power distribution system may be used to measure performance, power quality, power consumption, power draw, stability, service levels, or other attributes of a power distribution system. Examples of characteristics of a power distribution system that may be included in signals exchanged among power components include phase, power redundancy, voltage levels, usage levels, and temperature.

In some embodiments, signals exchanged among power components are used to assess redundancy status of one or more power components in a power distribution system. For example, a power supply unit may receive identification signals from two or more upstream power components. From the identification signals, it may be determined that the power supply unit has redundant power.

In some embodiments, signals exchanged among power components may include information about the phase of power being delivered to one or more components in a system. For example, a power distribution unit may receive a signal indicating that power received on one leg of the power distribution unit is receiving power in phase combination A-B, while another leg of the same power distribution unit may be receiving power in phase combination B-C. In some embodiments, loads or power components may be switched based on phase information exchanged among power components.

Transformer 110 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 106 in the event of a failure of utility power to transformer 110. In one embodiment, one of generators 112 provides back-up power for each of primary power systems 116.

UPS 118 may provide uninterrupted power to racks 106 in the event of a power failure upstream from UPS 118. In certain embodiments, a UPS receives three-phase power from a transformer. The UPS may supply three-phase power to a floor power distribution unit.

PDU power may be any suitable voltage. In one embodiment, electrical power is about 208 V. In one embodiment, electrical power is about 230 V. In some embodiments, different electrical systems 104 may operate on different phases of a primary power system. Each of the legs may correspond to one phase of the input power. In one embodiment, each leg operates at a voltage between about 220 volts to about 260 volts.

In operation of system 100, receptacles in rack PDU 122 may be used to supply power to electrical systems in rack 106, such as servers. Electrical systems 104 may be coupled to rack power distribution unit 122 by way of cables.

Each of the legs in rack PDU 122 may include a breaker. In one embodiment, each breaker is a 30 A/32 A single pole MCB. Breakers may be located such that they can be accessed when server racks are in-line (e.g., at the top of rack power distribution unit 126). In one embodiment, power is provided to a rack PDU by way of an 8 AWG/6 mm$^2$ 5 core cable and a 30 A NEMA/32 A IEC309 3Ph+N+E Plug.

Reserve power system 130 may provide reserve power for any or all of the electrical systems 104 supplied by primary power systems 116. In some embodiments, reserve power system 130 is powered up at all times during operation of system 100. Reserve power system 130 may be passive until a failure of one or more components of the primary power system for one or more of electrical systems 104, at which time reserve power system 130 may become active.

In some embodiments, power components in reserve power system 130 exchange power-related signals among one another or with power components in a primary power distribution system. In certain embodiments, power components in a reserve power system include power discovery modules, such as power discovery modules 124.

For illustrative purposes, three switchgear apparatus 114, four UPSs 118, and ten PDUs 120 are shown in FIG. 1. The number of power distribution units, UPSs, switchgear apparatus may, however, vary from embodiment to embodiment (and, within a given embodiment, from system to system). For example, each of UPSs 118 may supply power to any suitable number of power distribution units 120. As another example, each of switchgear apparatus 114 may supply power to any suitable number of UPSs 118.

In FIG. 1, arrows are used to illustrate one example of signals being passed upstream and downstream among power components in power distribution system 102. For example, signals 156 may be passed between UPS 1 and PDUs 1-9.

In some embodiments, signals transmitted by a power component may be associated with a particular component in a power distribution system, a combination of components (a primary power system with a particular UPS and a particular set of PDUs), or a point or location in the power distribution system.

In some embodiments, signals exchanged by power components are used to generate a power connectivity map for a power distribution system. The power connectivity map may be based on signals sent from, and received by, various power components in the power distribution system. For example, in the embodiment shown in FIG. 1, a map can be established based on signal at each of power supply units 108, rack PDUs 122, PDUs 120, and UPSs 118.

In some embodiments, baseline data for mapping a power distribution system is acquired from signals exchanged among power components in the power distribution system. The data in the map may be stored in a database. At a later time, the map may be updated based on a new set of signals from the power components. Comparisons between the baseline data and current data may be used to assess conditions or components in the power distribution system.

In some embodiments, a power distribution assessment system may be used to detect or trace electrical anomalies in the power distribution system. Such electrical anomalies may include a failure or out-of-tolerance condition of a component in the distribution chain.

In some embodiments, a power distribution assessment system is used to assess conditions or components in a power distribution system having multiple phase output. In one embodiment, the power distribution system has a three phase output. In some embodiments, a signal may include information identifying the phase of the line. For example, signals 156a, 156b, and 156c may each be carried on a line that is on a different phase or phase combination (for example, AB, BC, and CA). In some embodiments, a separate signal is associated with each phase or phase combination in the power distribution system.

In some embodiments, a power distribution assessment system is used to assess electrical power draw in one or more locations in a power distribution system based on signals between power components. Power consumption may be monitored at any location in a power distribution system, including power supply units, rack PDUs, or UPSs. In certain embodiments, the system may perform corrective actions, such as switching to reserve power or shutting down an electrical system, based on power consumption information for one or more power components in a power distribution system.

PDU and Power Supply Unit Information Exchange

In some embodiments, configuring descriptions (such as an identifying number) are associated with each of the receptacles on a power distribution unit. Signals may be sent from the power distribution unit to connected power supply units of electrical systems that receive power from the power distribution unit. The connected power supply units or electrical systems may receive the signal. In some embodiments, the power supply unit or electrical system may display information from the signal to a user via the control interface of the electrical system. The power supply unit may send back a signal, such as an identifying signal, back to the power distribution unit (PDU). A control system of the PDU may display information based on the signals received from the power supply unit.

Figure 2:
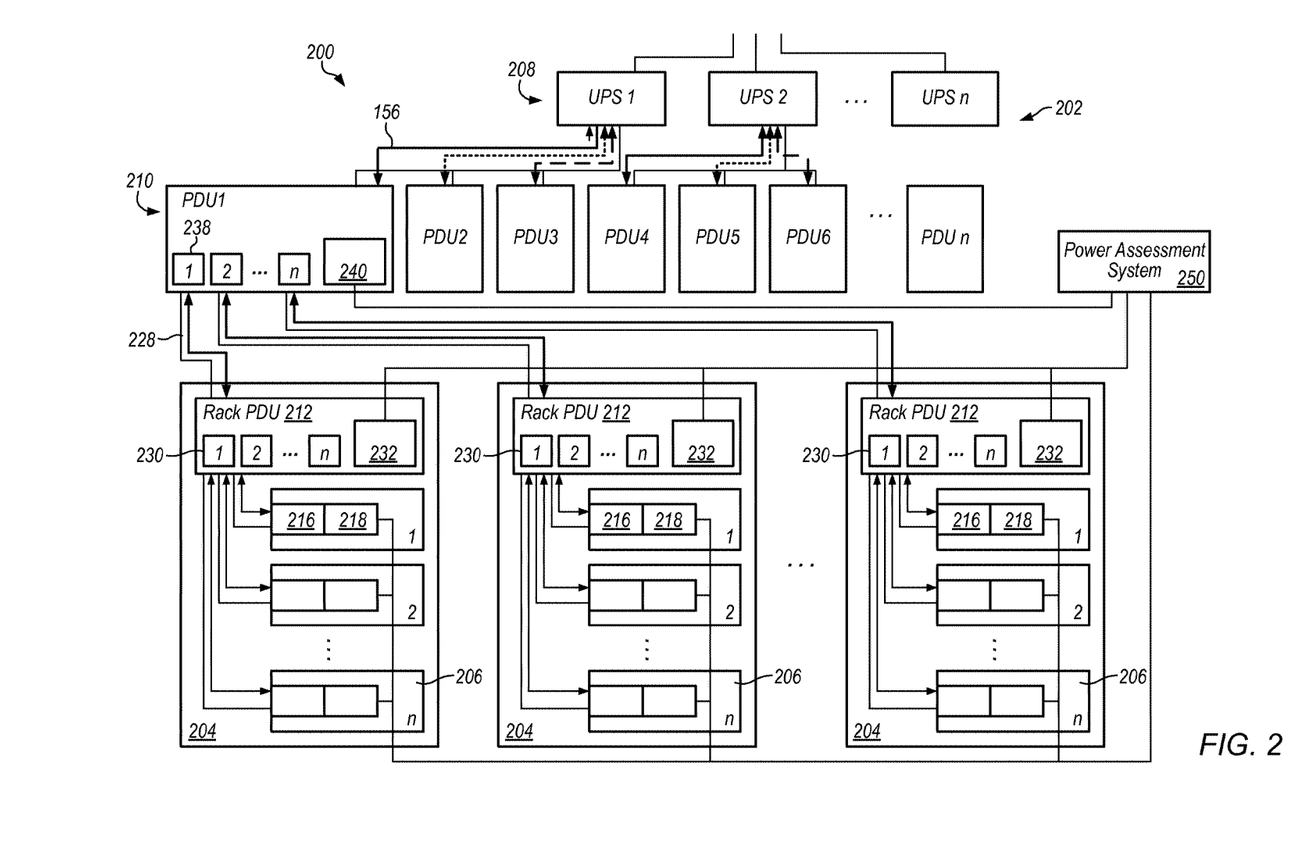
FIG. 2 illustrates one embodiment of a system that allows information exchange over power transmission lines between a power distribution units and power supply units in computing devices.

FIG. 2 illustrates one embodiment of a system that allows information exchange over power transmission lines between a power distribution units and power supply units in computing devices. The computing devices may be, for example, rack-mounted servers in a data center.

System 200 includes primary power system 202, computing devices 204, and racks 206. Computing devices 204 are installed in racks 206. Primary power system 202 includes uninterruptible power supplies 208, floor PDU 210, and rack PDU 212. Each of computing devices 204 includes one or more of power supply units 216.

Computing devices 204 include power discovery module 218. Power discovery module 218 may send and receive signals to and from power components upstream from power supply unit 216. Signals exchanged by power discovery module 218 may be carried power lines 220.

Rack PDUs 212 may include input lines 228, output receptacles 230, and rack PDU power discovery module 232. Each of rack PDU power discovery modules 232 may send and receive signals to and from power components upstream and downstream from the rack PDU. Rack PDU power discovery modules 232 may associate separate identifying information with each of input lines 228 and each of output receptacles 230.

Floor PDU 210 may include input lines 236, output receptacles 238, and rack PDU power discovery module 240. Floor PDU power discovery module 240 may send and receive signals to and from power components upstream and downstream from floor PDU 210. Floor PDU power discovery module 240 may associate separate identifying information with each of input lines 236 and each of output receptacles 238.

Each of power supply units 216 may exchange signals with rack PDUs 212 and floor PDUs 210 from which the power supply unit 216 receives power. In some embodiments, each power supply units 216 receives a signal including identifying information for the PDU outputs to which it is coupled (for example, a particular one of the PDU output receptacles.) Rack PDUs 212 and floor PDU 210 may receive signals from one or more of power supply units 216 including identifying information for the power supply units. Examples of information that may exchanged between a PDU and power supply unit, or between PDUs, include: requested reserved power, actual power usage, redundancy status, location, serial number, and temperature.

Power discovery modules 218, 232, and 240 may be connected to power assessment system 250. In one embodiment, connections between power discovery modules 218, 232, and 240 are by way a network connection. Power assessment system 250 may send messages to, and receive messages from, power discovery modules 218, 232, and 240 relating to signals exchanged among power components in system 200.

In some embodiments, a warning message is sent by an upstream power component to one or more downstream power components of an anticipated loss of power. For example, a dying gasp message may be sent from floor PDU 210 to one or more of power supply units 208 upon, or in anticipation of, a loss of source power. Power components receiving a warning message may log the reason that power was lost and display that information. The information may be displayed, for example, as part of a power supply status report for equipment.

Figure 3:
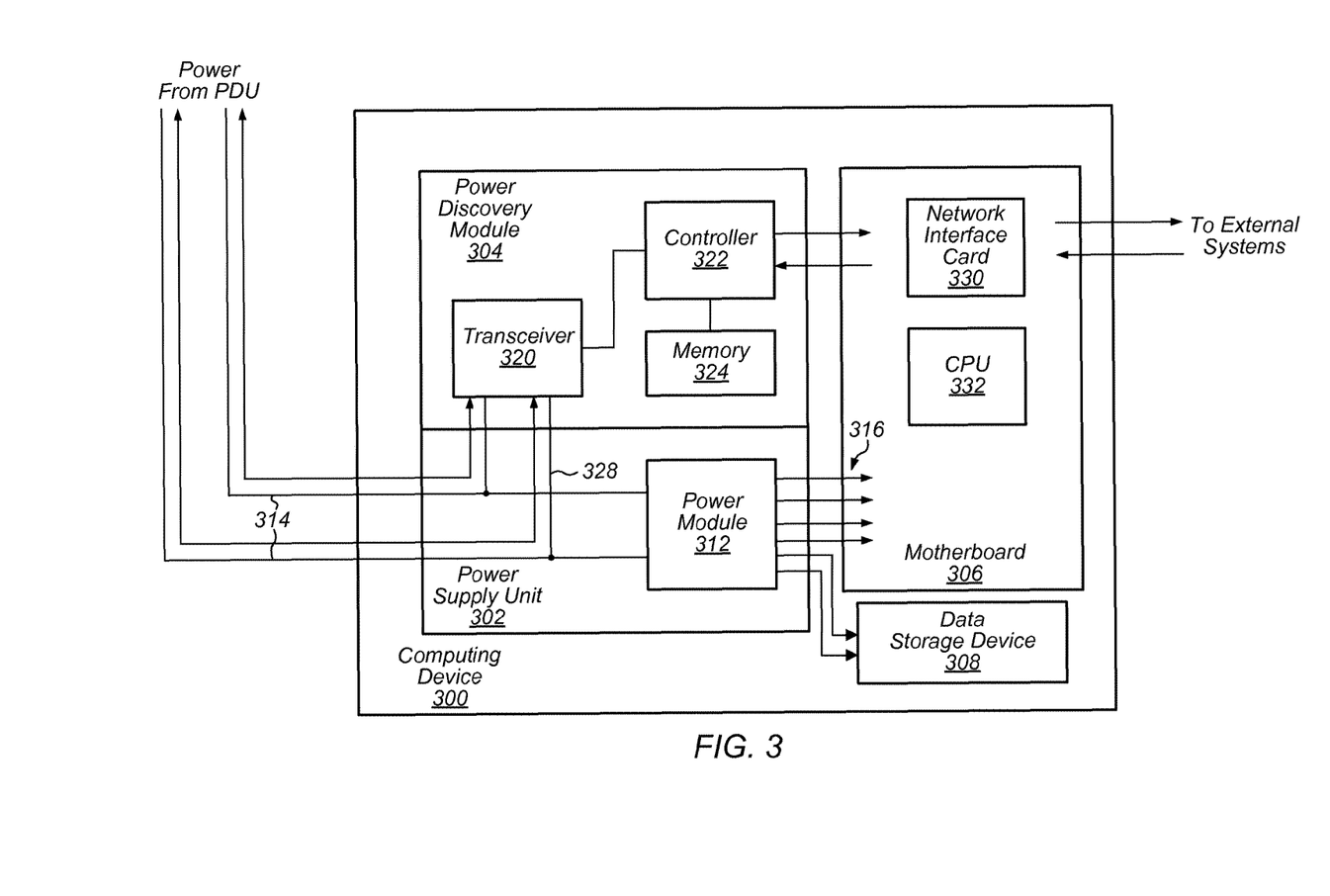
FIG. 3 illustrates one embodiment of a computing device having a power discovery module that can transmit and receive signals to power components by way of a power supply unit.

FIG. 3 illustrates one embodiment of a computing device including a power discovery module that can transmit and receive signals to power components by way of a power supply unit. Computing device 300 includes power supply unit 302, power discovery module 304, motherboard 306, and data storage device 308.

Power supply unit 302 is coupled to motherboard 306 and data storage devices 308. Power supply unit 302 may supply electrical power to components on motherboard 306, data storage devices 308, and to other electrical components of computing device 300.

Power supply unit 302 includes power module 312, power supply input lines 314, and power supply output lines 316. Power module 302 may include power transformers, power converters, and/or power conditioning devices. Power supply unit 302 may receive power through power supply input lines 314 and distribute power to electrical components in computing device 300 through power supply output lines 316. In some embodiments, output from a power supply unit may conform to an industry standard. In one embodiment, the voltages and functions conform to an ATX standard. In various other embodiments, the output from a power module may conform to other standards, such as Entry-Level Power Supply Specification, or EPS12V. In one embodiment, power supply output lines 316 include multiple +12 volt lines, multiple +5.5 lines, multiple ground lines, etc. As another example, power supply output lines 316 may include multiple +12 volt lines, multiple 0 volt lines, etc.

Power discovery module 304 includes transceiver 320, controller 322, and memory 324. Transceiver 324 is coupled to power supply input lines 314 by way of lines 328. In one embodiment, a separate line connects each of the input power lines of a power supply unit to the power discovery module. In certain embodiments, a power discovery module may be connected to output power lines of a power supply unit (for example, power supply output lines 316 shown in FIG. 3). Transceiver 324 may send and receive signals over power supply input lines 314. For example, transceiver 324 may send and receive signals from a rack power distribution unit or other upstream component supplying power to power supply unit 302 by way of power input lines 314.

Controller 322 may exchange information with motherboard 306 and systems external to computing device 300. Controller 322 may include logic circuits for managing signal received from power components by way of transceiver 320. In one embodiment, controller 322 exchanges information with external components by way of network interface card 330 in computing device 300.

Controller 322 may be coupled to memory 324. Memory 324 may store instructions for use by controller 322 in controlling actions in power discovery module 304. In some embodiments, memory 324 stores identifying information for power supply unit 304 and/or computing device 300. Memory 324 may store information received from power components in the power distribution system. Memory 324 may store information to be used in messages to other power components in the power distribution system.

Although power discovery module 304 is shown as a separate module from power supply unit 302 and motherboard 306, devices and components of a power discovery module may be included in power supply unit 302, motherboard 306, or a combination thereof. In some embodiments, power discovery devices and components, such as transceiver 320, controller 322, or memory 324, are integrated into a motherboard. In other embodiments, power discovery devices and components are integrated into a power supply unit.

In some embodiments, a power supply unit passes through signals received through power transmission lines to another component coupled to the power supply, such as a motherboard of a computing device. In certain embodiments, a power supply unit may receive one signal from an external device and generate another signal to be transmitted over power transmission lines based on the input signal from the external device. In some embodiments, signals passing between a power supply unit and an external device are analog signals.

In some embodiments, an electrical system, such as a computing device includes two or more power supply units. In some embodiments, two or more of the power supply units can send and receive signals over power lines to one another, or to other power components in a power distribution system.

Power discovery components on various other power components in a power distribution system may be similar to those described above for the power supply unit relative to FIG. 3. For example, rack PDUs, floor PDUs, and UPSs may each include a transceiver, memory, and logic.

Figure 4:
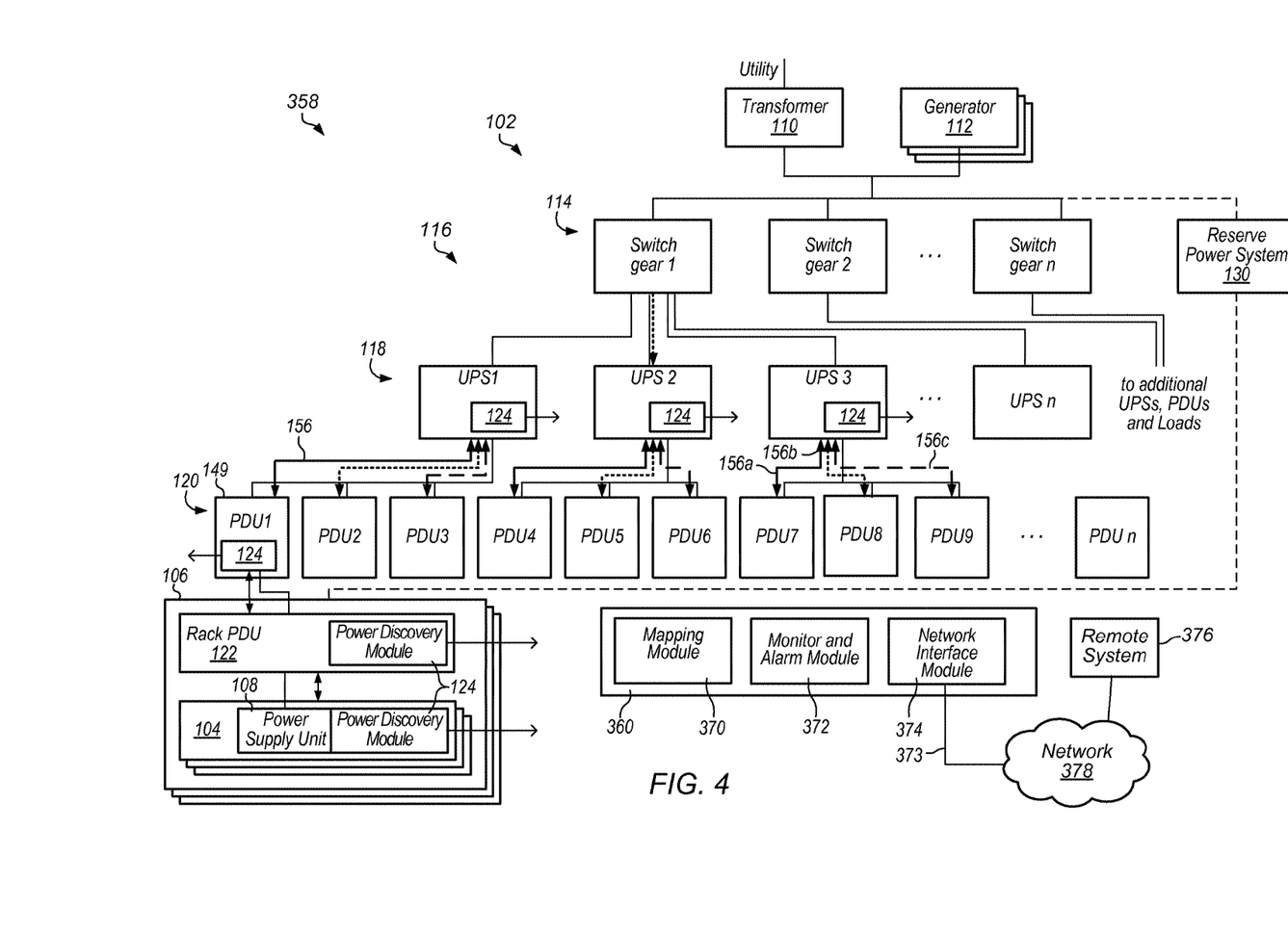
FIG. 4 illustrates one embodiment of a power distribution assessment system having a mapping module and an alarm module.

In some embodiments, a power distribution assessment system creates and store connectivity maps for one or more power distribution systems based on information acquired from signals exchanged among power components in a power distribution system. In some embodiments, a power distribution assessment system can activate or send an alarm (if, for example, conditions in the power distribution system require intervention by maintenance personnel). FIG. 4 illustrates one embodiment of a power distribution assessment system having a mapping module and an alarm module. Data center 358 includes power distribution assessment system 360. Power distribution assessment system 360 includes mapping module 370, and monitor and alarm module 372.

Mapping module may create and store connectivity maps in a memory. The maps may be based on data received from signals exchanged among power discovery modules 124 in various power components of power distribution system 102. In some embodiments, data from the map may be retrieved from memory for use in assessing conditions in the power distribution system.

Monitor and alarm module 372 may assess and monitor conditions in power distribution system 102. In certain embodiments, maps for power distribution system 102 are periodically updated. In the event of an electrical anomaly, monitor and alarm module 372 may send or activate an alarm. In one embodiment, monitor and alarm module 372 triggers an audible alarm.

In some embodiments, a power distribution assessment system acquires information from power components exchanges among two or more levels in the power distribution system.

Power distribution assessment system 360 is coupled to network 378 by way of lines 373. Lines 373 may each be, in various embodiments, a cable, an electrical bus, or a combination thereof. In certain embodiments, lines 373 include a wireless connection between power distribution assessment system 360 and the coupled element.

In some embodiments, power distribution assessment module 360 includes a microprocessor that implements program instructions for monitoring and reporting on power distribution system 102. In some embodiments, some or all of the components of the power distribution assessment system 360 are contained in an enclosure. The enclosure may be mounted inside the rack, on the rack, or at another location.

In some embodiments, a method of using a power distribution assessment system includes reporting to a system external the monitor (for example, a remote computer system). For example, a message may be sent over a network to a remote computer that power has been lost in a particular PDU supplying power in a data center.

Network interface module 374 may exchange data and signals between power distribution assessment system 360 and remote system 376 over network 378. In one embodiment, network interface module 374 is an Ethernet card. In another embodiment, network interface module 374 provides for a fiber optic transmission of data. In some embodiments, some or all of the components in power distribution system 102 are each assigned an address. If a fault condition exists, a send a fault message to remote system 376 over network 378. The message may include the appropriate address to identify the failed component.

In some embodiments, messages are sent from power distribution assessment system 360 using Simple Network Management Protocol (SNMP) data (for example, an SNMP trap). Any network protocol, however, may be used in various embodiments to send data from, or receive data into, power distribution assessment system 360.

In some embodiments, power distribution assessment system 360 may control an alarm at the location of the rack PDUs. For example, an audible alarm (such as a buzzer or siren) or a visual alarm (flashing light). Upon failure of a component in the power distribution assessment system, the power distribution assessment system may trigger the alarm.

In some embodiments, a power distribution assessment system (such as power distribution assessment system 360) is rack-mountable. In one embodiment, an enclosure for a power distribution assessment system includes rack ears to allow the power distribution assessment system to be installed in a rack. In one embodiment, power distribution assessment system 360 mounts in a 1U slot in a 19 inch standard rack. A power distribution assessment system may, however, be any shape and size. In certain embodiments, a power distribution assessment system has a "zero U" form factor that allows installation in a rack such that the system does not consume any of the slots in the rack.

Figure 5:
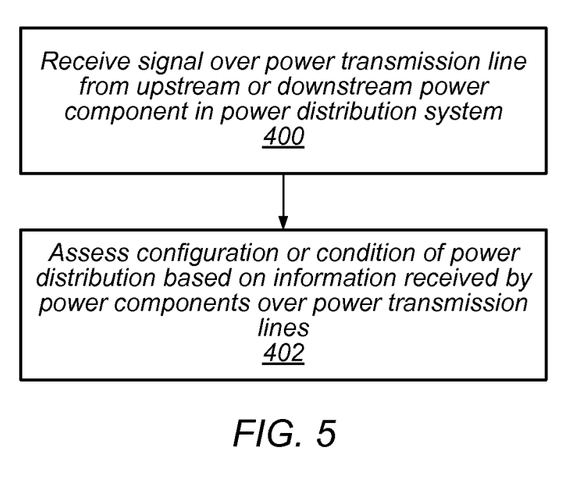
FIG. 5 illustrates assessing power component configuration or conditions in a power distribution system with information exchange among power components.

FIG. 5 illustrates assessing power component configuration or conditions in a power distribution system with information exchange among power components. At 400, a signal is received over one or more power transmission lines from an upstream or downstream power component of the power distribution system. In some embodiments, the signal includes identifying information for the power component sending the signal. In some embodiments, the signal includes information about characteristics or conditions of power components in the power distribution system.

At 402, a configuration or condition of the power distribution system is assessed based on the information received by the power component over the one or more power transmission lines. In some embodiments, the power distribution system is mapped based on information from signals from two or more power components.

In some embodiments, signals between power components are used to assess conditions or characteristics of power components, or of power being transmitted in the power distribution system. As an example, a fault condition, or anticipated fault condition, may be signaled by way of a signal from one power component to another, such as a dying gasp warning message from a PDU to a power supply unit.

In some embodiments, baseline data is established from one or more signals transmitted upstream or downstream from one power component to another in the power distribution system. During operation of the power distribution system to supply power to loads, the signals may be re-transmitted, and received signals compared to base line information based on, for example, signals acquired at an earlier point in time. Conditions or components in the power distribution system may be assessed based on the comparisons with the baseline information.

In certain embodiments, assessment is performed at a periodical interval (for example, once a week). In certain embodiments, assessment is performed on a continuous basis (for example, continuously monitoring for changes in the power distribution system). Assessments may be made, for example, by comparing the signals with information from the baseline data. A change from the baseline measurements may reflect a change or anomaly in the power distribution system.

In various embodiments, assessment of the power distribution system may include: identifying a change in the configuration of components in a system, identifying an electrical anomaly (such as a faulty component or group of components), identifying the type of a component that is actually installed (such as a type of transformer having a particular output), or identifying components that have been added or removed since the baseline was established. In each case, the assessment may be based, at least in part, on a comparison of current information acquired from power components signals with baseline information previously acquired from power component signals.

In some embodiments, baseline data are updated on a periodic basis (for example, once a day, or once a week). In certain embodiments, the last reading taken for a given point may serve as the baseline for that point. In certain embodiments, a power distribution system may be continuously monitored using signal comparisons.

Figure 6:
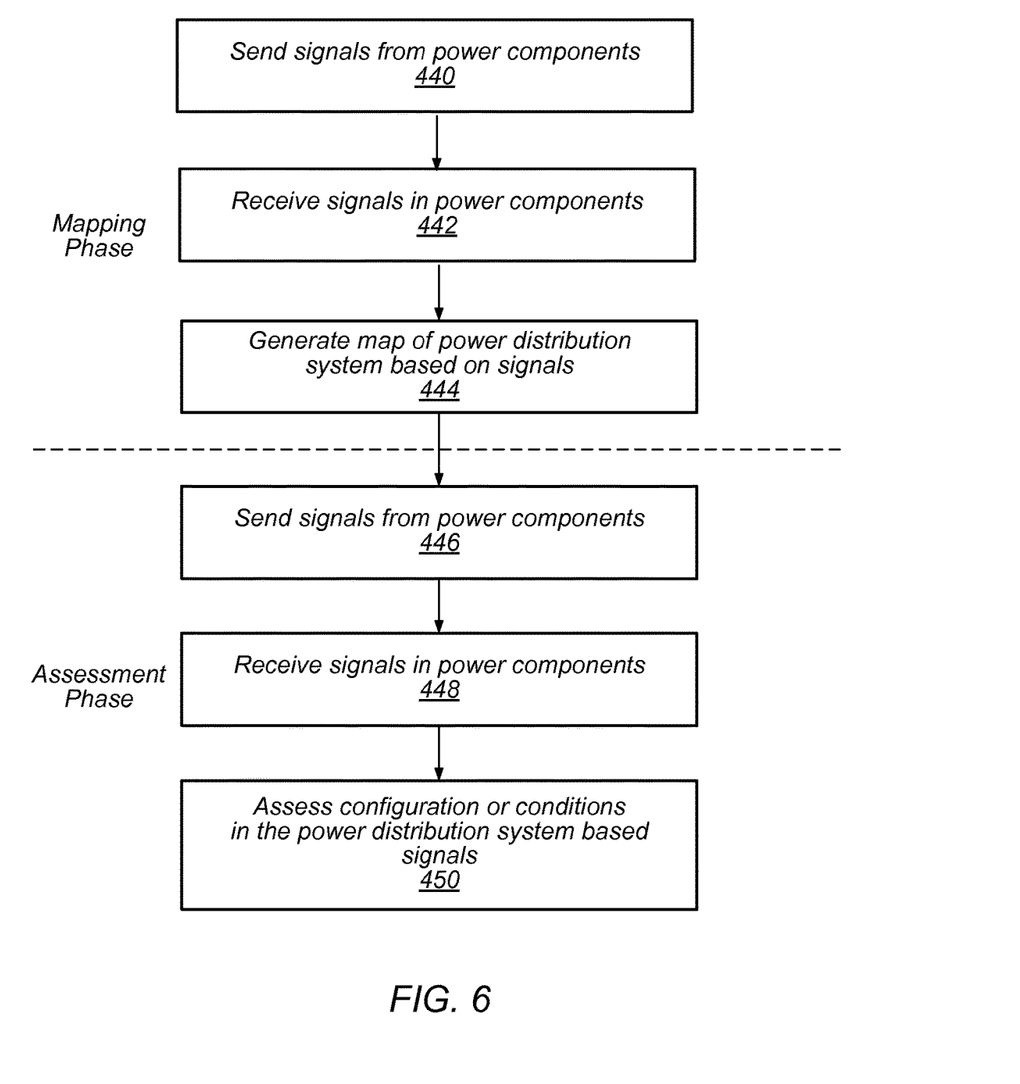
FIG. 6 illustrates one embodiment of assessing a power distribution system using a map generated from signals transmitted among power components in the power distribution system.

In some embodiments, a map for a power distribution system is generated from signals passed among power components. FIG. 6 illustrates one embodiment of assessing an electrical power distribution system using a map generated from signals transmitted among power components in the power distribution system. At 440, signals are sent by in one or more power components in the power distribution system to one or more other components. At 442, signals are received in one or more power components in the power distribution system from one or more other components. In some embodiments, the signals are transmitted from one component to an upstream or downstream component over power transmission lines between the power components.

At 444, a map of the power distribution system is generated based on one or more of the signals received by the power components. The map may include connectivity information. In one embodiment, a map includes information on which power distribution units, or which receptacle of a power distribution unit, a particular power supply unit(s) is connected to.

In certain embodiments, generating the map involve personnel moving a receiver from one location to another in the power distribution system until a suitable number of locations has been checked. In other embodiments, receivers are already in place on various components, and the output signals acquired automatically. In one embodiment, information is acquired for all components in the power distribution system (for example, acquiring information from a signal at each UPS, each floor PDU, each rack PDU, and each power supply unit). In other embodiments, however, information is acquired using signals acquired from representative components and at representative points in the power distribution system.

At 446 through 450, the power distribution system is assessed. At 446, signals are sent by one or more power components in the power distribution system. At 448, the signals are received by one or more power components power distribution system.

At 450, conditions or components in the power distribution system are assessed. The assessment may be made, for example by comparing the received signals with information from the map of the power distribution system.

In some embodiments, an assessment includes identifying the portion of a power distribution system that is affected by a change, anomaly, or failure. The portion may be, for example, a subset of components of the power distribution system. For example, referring to FIG. 1, if the signals 156*a*, 156*b*, and 156*c* change, but all other signals are unchanged from the baseline, the system may determine that UPS 3 has failed and that all the components downstream from UPS 3 (PDU7, PDU 8, PDU 9 and the rack systems connected to such PDUs) are at risk.

Upon determining that a subset of components is at risk, the system may generate an alarm. The alarm may provide personnel with a warning that corrective action may be required for the components in the potential blast radius. In one embodiment, a system automatically queries whether reserve power is in place for the components in the potential blast radius (e.g., the system is set to fail over to the reserve power if the primary power components fail). If reserve power is not in place, the system may automatically take corrective action or send an alarm.

In some embodiments, an assessment includes a query about the location of a signal generating by a power component in the power distribution system (for example, a "What am I connected to?" query). For example, an operator may plug a portable signal-reading device into a particular location (for example, "Rack 29") and acquire a signal. The signal may be compared with the map to generate information about the portable signal-reading device's position relative to components in the system. For example, referring to FIG. 1, if a user plugs a portable device into a rack connected to PDU 1, the system may use information from the map to determine that the rack is connected to Switch gear 1, UPS 1, and PDU 1.

In some embodiments, a map for a power distribution system is updated from time to time. The map may be updated, for example, on a periodic basis (such as daily or weekly), or after each maintenance event. The map update may capture changes to the components and connections in the power distribution system.

In various embodiments described above, assessment is described as occurring in phases. In some embodiments, phases are carried out in succession, for example, mapping phase at one point in time (for example, an initial mapping) followed by an assessment phase at a later point in time (for example, while troubleshooting a fault with the power distribution system in service). In some embodiments, however, the elements of the multiple phases are carried out concurrently. In some embodiments, mapping of a power distribution system is carried out concurrently with assessment of the power distribution system.

In some embodiments, a power distribution assessment system sends out a periodic status message for the power distribution system being monitored.

In some embodiments, a remote system may manage one or more power distribution assessment systems. In certain embodiments, a remote system may query power distribution assessment systems, for example, by way of a message over a network. In some embodiments, trend analysis for one or more power distribution systems may be carried out using data from one or more power distribution assessment systems, either on a power distribution assessment system or on a remote system receiving data from the power distribution assessment systems.

In some embodiments, a power distribution assessment system may perform, or provide data for, statistics or trend analysis one or more components in the system. For example, a power distribution assessment system may determine a percentage of time a particular UPS or a particular PDU has been down during a particular period of time.

In various embodiments described above, power distribution monitoring is carried out for computing systems (for example, servers) in a data center. Nevertheless, monitoring may be carried out for power distribution to any type of electrical system. Examples include hospital equipment, utility systems, security systems, military systems, telecommunications systems, or electronic commerce systems. In certain embodiments, power distribution monitoring is carried out for a critical system, such as a life support system.

In various embodiments described above, power components include modules or devices for both sending and receiving signals to other power components in a power distribution system. Power components, nevertheless, may, in various embodiments, include devices only for sending signals to other power components, or only for receiving signals from other power components.

In many of the embodiments described above, signals are exchanged among power components in a power distribution system over power transmission lines between the power components. Signals may, nevertheless, may, in certain embodiments, be exchanged between power components using other mediums, such as network signals exchanged by way of a fiber optic connection.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power distribution system, comprising:
two or more power components configured to distribute power to one or more electrical components;
two or more power transmission lines configured to transmit power from at least one of the power components to at least one other of the power components;
wherein each of at least two of the two or more power components comprise one or more signal devices configured to send and receive signals over at least one of the power transmission lines to one or more upstream power components in the power distribution system or one or more downstream power components in the power distribution system,
wherein the one or more signal devices are configured to include in the signals information about at least one of the power components in the power distribution system; and
one or more computing devices configured to perform one or more response actions based at least in part on a comparison between a stored baseline for the power distribution system and a current assessment of the power distribution system, wherein the current assessment is based at least in part on current information acquired from the signals corresponding to the at least one of the power components.

2. The power distribution system of claim 1, wherein at least one of the signal devices of the power components is configured to send and receive signals over at least one of the power transmission lines while power is being transmitted over the at least one power transmission line.

3. The power distribution system of claim 1, wherein at least one of the power components is configured to send, via a signal device of the at least one power component, a signal that includes self-identifying information to one or more other components over at least one of the power transmission lines.

4. The power distribution system of claim 1, wherein at least one of the power components is configured to send, via a signal device of the at least one power component, a signal that includes characteristics or conditions of the at least one power component to one or more other components over at least one of the power transmission lines.

5. The power distribution system of claim 1, wherein at least one of the power components is configured to send, via a signal device of the at least one power component, a signal that includes characteristics or conditions of power in the power distribution system to one or more other components over at least one of the power transmission lines.

6. The power distribution system of claim 1, wherein at least one of the power components comprising the one or more signal devices configured to send and receive signals is a power supply unit for at least one electrical system.

7. The power distribution system of claim 1, wherein at least one of the power components comprising the one or more signal devices configured to send and receive signals is a power distribution unit for at least one electrical system.

8. The power distribution system of claim 1, further comprising one or more computing devices coupled to at least one of the power components, wherein at least one of the one or more computing devices is configured to perform the current assessment of the power distribution system.

9. The power distribution system of claim 1, further comprising one or more computing devices coupled to at least one of the power components, wherein at least one of the one or more computing devices is configured to generate the baseline for the power distribution system based at least in part on signals exchanged among the power components over the power transmission lines.

10. A power distribution system, comprising:
one or more signal-transmitting power components, wherein at least one of the one or more signal-transmitting power components comprises one or more signal-transmitting devices configured to send a signal over one or more power transmission lines;
one or more signal-receiving power components upstream or downstream in the power distribution system from the least one of the one or more signal-transmitting power components, wherein at least one of the one or more signal-receiving components comprises one or more signal-receiving devices configured to receive the signal from the at least one of the one or more signal-transmitting power components over the one or more power transmission lines,
wherein the one or more signal-transmitting devices are configured to include in the signal information about at least one of the signal-transmitting power components or signal-receiving power components in the power distribution system; and
one or more computing devices configured to perform one or more response actions based at least in part on a comparison between a stored baseline for the power distribution system and a current assessment of the power distribution system, wherein the current assessment is based at least in part on current information acquired from the signals corresponding to the at least one of the signal-transmitting power components.

11. The power distribution system of claim 10, wherein at least one of the signal-transmitting devices is configured to send and receive signals over at least one of the one or more power transmission lines while power is being transmitted over the at least one power transmission line.

12. The power distribution system of claim 10, wherein at least one of the signal-transmitting power components supplies AC power, wherein the signal is transmitted over power transmission lines for the AC power.

13. The power distribution system of claim 10, wherein at least one of the signal-transmitting power components or signal-receiving power components comprises one or more signal devices configured to transmit and receive signals over at least one of the one or more power transmission lines.

14. The power distribution system of claim 10, wherein at least one of the one or more signal-transmitting power components is configured to send, via a signal-transmitting device of the signal-transmitting power component, a signal that includes self-identifying information to at least one of the one or more signal-receiving power components, wherein the signal is sent over at least one of the one or more power transmission lines.

15. The power distribution system of claim 10, wherein at least one of the one or more signal-transmitting power components is configured to send, via a signal-transmitting device of the signal-transmitting power component, a signal that includes characteristics or conditions of the at least one signal-transmitting power component to at least one of the one or more signal-receiving power components, wherein the signal is sent over at least one of the one or more power transmission lines.

16. The power distribution system of claim 10, wherein at least one of the signal-transmitting power components is configured to send, via a signal-transmitting device of the signal-transmitting power component, a signal that includes characteristics or conditions of the power distribution system to at least one of the signal-receiving power components, wherein the signal is sent over at least one of the one or more power transmission lines.

17. The power distribution system of claim 10, wherein at least one of the one or more signal-transmitting power components is configured to send, via a signal-transmitting device of the signal-transmitting power component, signals including information about usage or availability of the at least one signal-transmitting power component to at least one of the one or more signal-receiving power components over the power transmission lines.

18. The power distribution system of claim 10, wherein at least one of the signal-transmitting power components or the signal-receiving power components is a power supply unit for one or more computing devices.

19. The power distribution system of claim 10, wherein at least one of the signal-transmitting power components is a neighbor of at least one of the signal-receiving power components.

20. The power distribution system of claim 10, wherein at least one of the signal-transmitting power components or the signal-receiving power components is a power distribution unit and at least one of the signal-transmitting power components or at least one of the signal-receiving power components is a power supply unit for one or more computing devices, wherein the power distribution unit is configured to deliver power to the power supply unit,
wherein the power distribution unit comprises one or more signal devices configured to send signals to, and receive signals from, the power supply unit over one or more power transmission lines between the power distribution unit and the power supply unit, and
wherein the power supply unit comprises one or more other signal devices configured to send signals to, and receive signals from, the power distribution unit over one or more power transmission lines between the power distribution unit and the power supply unit.

\* \* \* \* \*